United States Patent
Savalle et al.

(10) Patent No.: US 10,164,991 B2
(45) Date of Patent: Dec. 25, 2018

(54) HIERARCHICAL MODELS USING SELF ORGANIZING LEARNING TOPOLOGIES

(71) Applicant: Cisco Technology, Inc., San Jose, CA (US)

(72) Inventors: Pierre-André Savalle, Rueil-Malmaison (FR); Grégory Mermoud, Veyras (CH); Laurent Sartran, Palaiseau (FR); Jean-Philippe Vasseur, Anchorage, AK (US)

(73) Assignee: Cisco Technology, Inc., San Jose, CA (US)

( * ) Notice: Subject to any disclaimer, the term of this patent is extended or adjusted under 35 U.S.C. 154(b) by 212 days.

(21) Appl. No.: 15/176,652

(22) Filed: Jun. 8, 2016

(65) Prior Publication Data
US 2017/0279828 A1 Sep. 28, 2017

Related U.S. Application Data

(60) Provisional application No. 62/313,322, filed on Mar. 25, 2016.

(51) Int. Cl.
*H04L 29/06* (2006.01)
*H04L 12/24* (2006.01)

(52) U.S. Cl.
CPC ........ *H04L 63/1425* (2013.01); *H04L 41/142* (2013.01); *H04L 63/0236* (2013.01); *H04L 63/1416* (2013.01); *H04L 63/1458* (2013.01)

(58) Field of Classification Search
CPC .................................................. H04L 63/1425
See application file for complete search history.

(56) References Cited

U.S. PATENT DOCUMENTS

| | | |
|---|---|---|
| 8,800,036 B2 | 8/2014 | Khayam et al. |
| 9,210,181 B1 | 12/2015 | Nandy et al. |
| 2005/0038818 A1 | 2/2005 | Hooks |
| 2008/0295172 A1* | 11/2008 | Bohacek ............. H04L 63/1416 726/23 |

(Continued)

OTHER PUBLICATIONS

European Search Report dated Jul. 12, 2017 in connection with European Application No. 17162413.

(Continued)

*Primary Examiner* — David J Pearson
(74) *Attorney, Agent, or Firm* — Parker Ibrahim & Berg LLP; James M. Behmke; Stephen D. LeBarron

(57) ABSTRACT

In one embodiment, a device in a network maintains a plurality of anomaly detection models for different sets of aggregated traffic data regarding traffic in the network. The device determines a measure of confidence in a particular one of the anomaly detection models that evaluates a particular set of aggregated traffic data. The device dynamically replaces the particular anomaly detection model with a second anomaly detection model configured to evaluate the particular set of aggregated traffic data and has a different model capacity than that of the particular anomaly detection model. The device provides an anomaly event notification to a supervisory controller based on a combined output of the second anomaly detection model and of one or more of the anomaly detection models in the plurality of anomaly detection models.

20 Claims, 15 Drawing Sheets

(56) References Cited

U.S. PATENT DOCUMENTS

| | | | |
|---|---|---|---|
| 2009/0138590 A1* | 5/2009 | Lee | H04L 43/045 709/224 |
| 2013/0198119 A1 | 8/2013 | Eberhardt, III et al. | |
| 2014/0108640 A1 | 4/2014 | Mathis | |
| 2015/0193694 A1 | 7/2015 | Vasseur et al. | |
| 2016/0028599 A1 | 1/2016 | Vasseur et al. | |
| 2016/0028751 A1 | 1/2016 | Cruz Mota et al. | |
| 2017/0024660 A1* | 1/2017 | Chen | G06N 99/005 |

OTHER PUBLICATIONS

VC dimension; https://en.wikipedia.org/wiki/VC_dimension; Apr. 29, 2016; pp. 1-3.

* cited by examiner

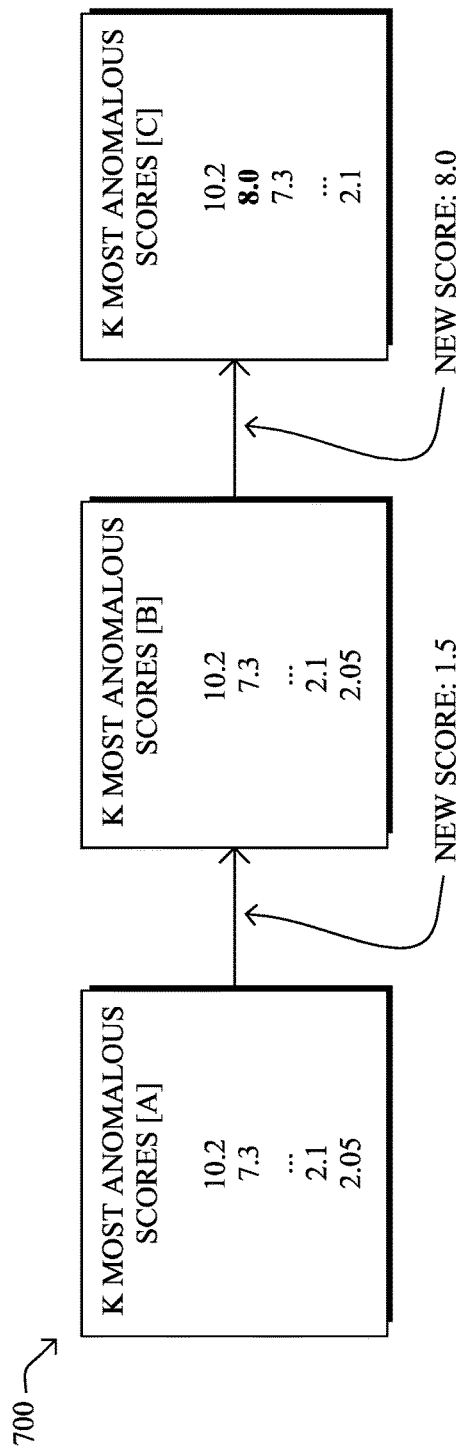
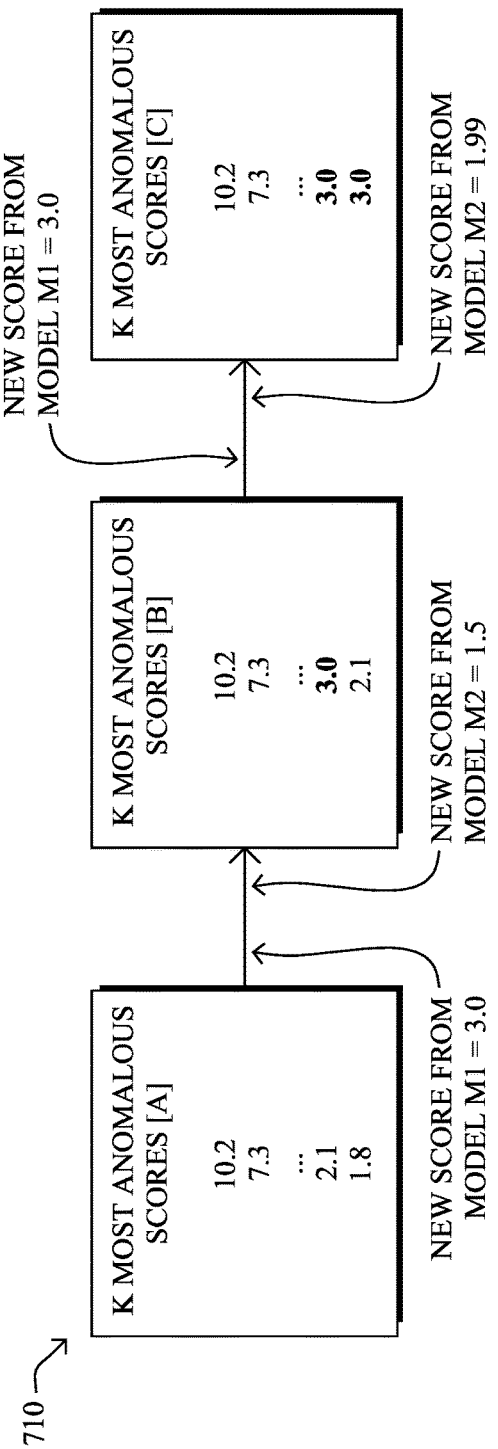
FIG. 7A
FIG. 7B

HIERARCHICAL MODELS USING SELF ORGANIZING LEARNING TOPOLOGIES

RELATED APPLICATIONS

This application claims priority to U.S. Provisional Application No. 62/313,322, filed Mar. 25, 2016, entitled "HIERARCHICAL MODELS USING SELF ORGANIZING LEARNING TOPOLOGIES," by Savalle et al., the contents of which are hereby incorporated by reference.

TECHNICAL FIELD

The present disclosure relates generally to computer networks, and, more particularly, to hierarchical models organizing learning topologies in a computer network.

BACKGROUND

Generally, Internet Behavioral Analytics (IBA) refers to the use of advanced analytics coupled with various networking technologies, to detect anomalies in a network. Such anomalies may include, for example, network attacks, malware, misbehaving and misconfigured devices, and the like. For example, the ability to model the behavior of a device (e.g., a host, networking switch, router, etc.) allows for the detection of malware, which is complimentary to the use of firewalls that use static signature. Observing behavioral changes (e.g., deviation from modeled behavior) using flows records, deep packet inspection, and the like, allows for the detection of an anomaly such as an horizontal movement (e.g. propagation of a malware, . . . ) or an attempt to perform information exfiltration, prompting the system to take remediation actions automatically.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 7A-7C illustrate examples of anomaly score reports;

DESCRIPTION OF EXAMPLE EMBODIMENTS

Overview

Figure 1A:
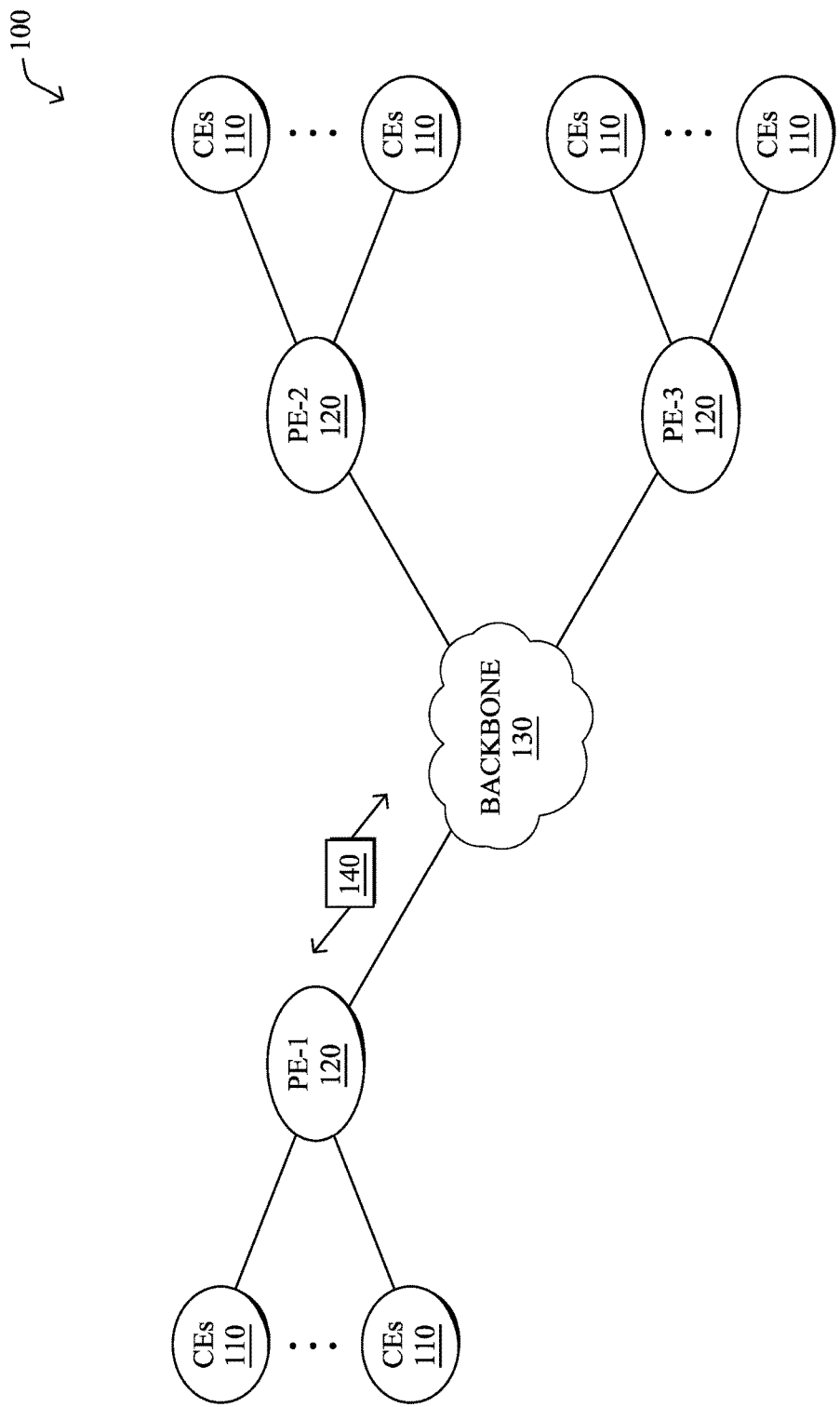
FIGS. 1A-1B illustrate an example communication network.

According to one or more embodiments of the disclosure, a device in a network maintains a plurality of anomaly detection models for different sets of aggregated traffic data regarding traffic in the network. The device determines a measure of confidence in a particular one of the anomaly detection models that evaluates a particular set of aggregated traffic data. The device dynamically replaces the particular anomaly detection model with a second anomaly detection model configured to evaluate the particular set of aggregated traffic data and has a different model capacity than that of the particular anomaly detection model. The device provides an anomaly event notification to a supervisory controller based on a combined output of the second anomaly detection model and of one or more of the anomaly detection models in the plurality of anomaly detection models.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
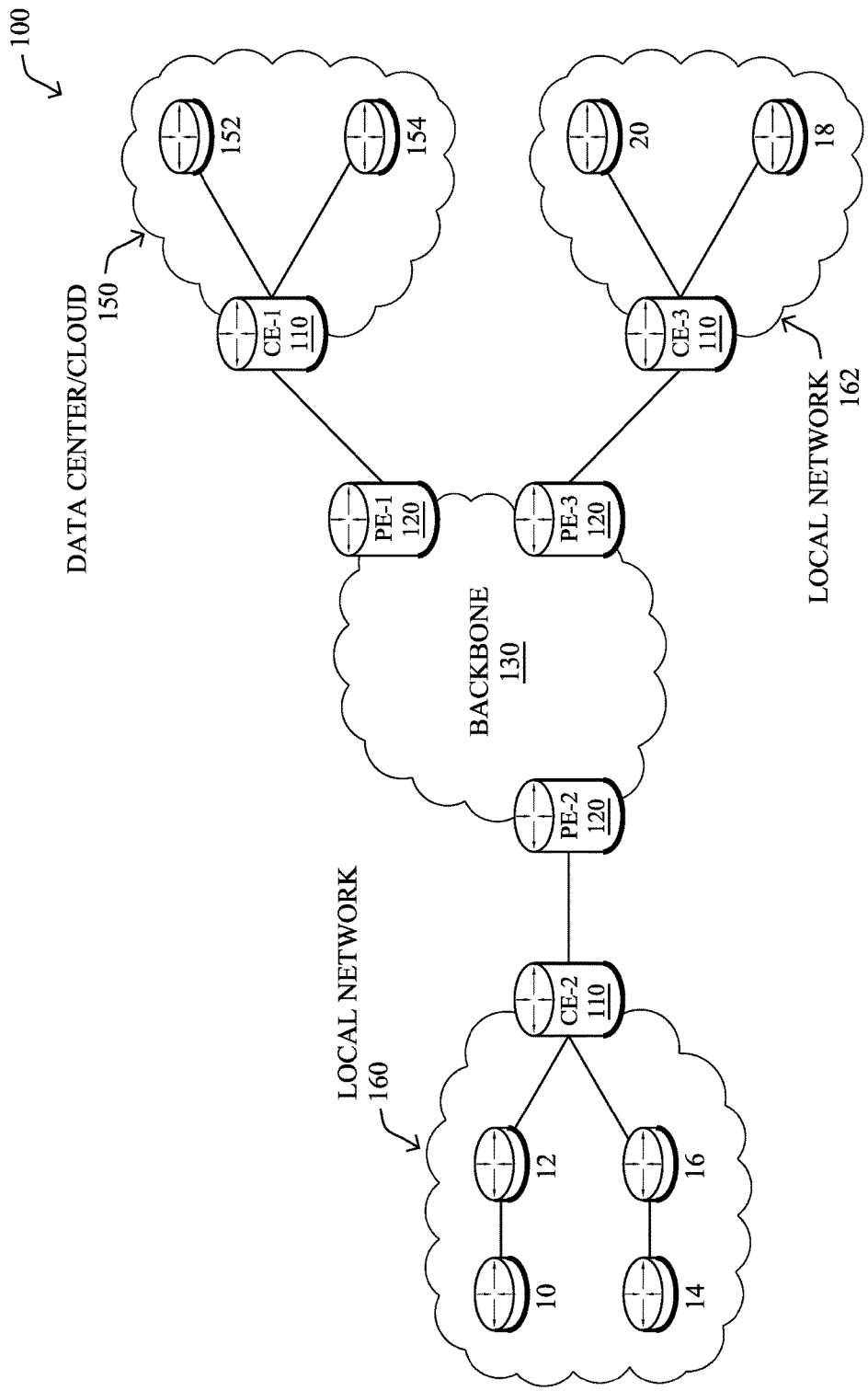

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
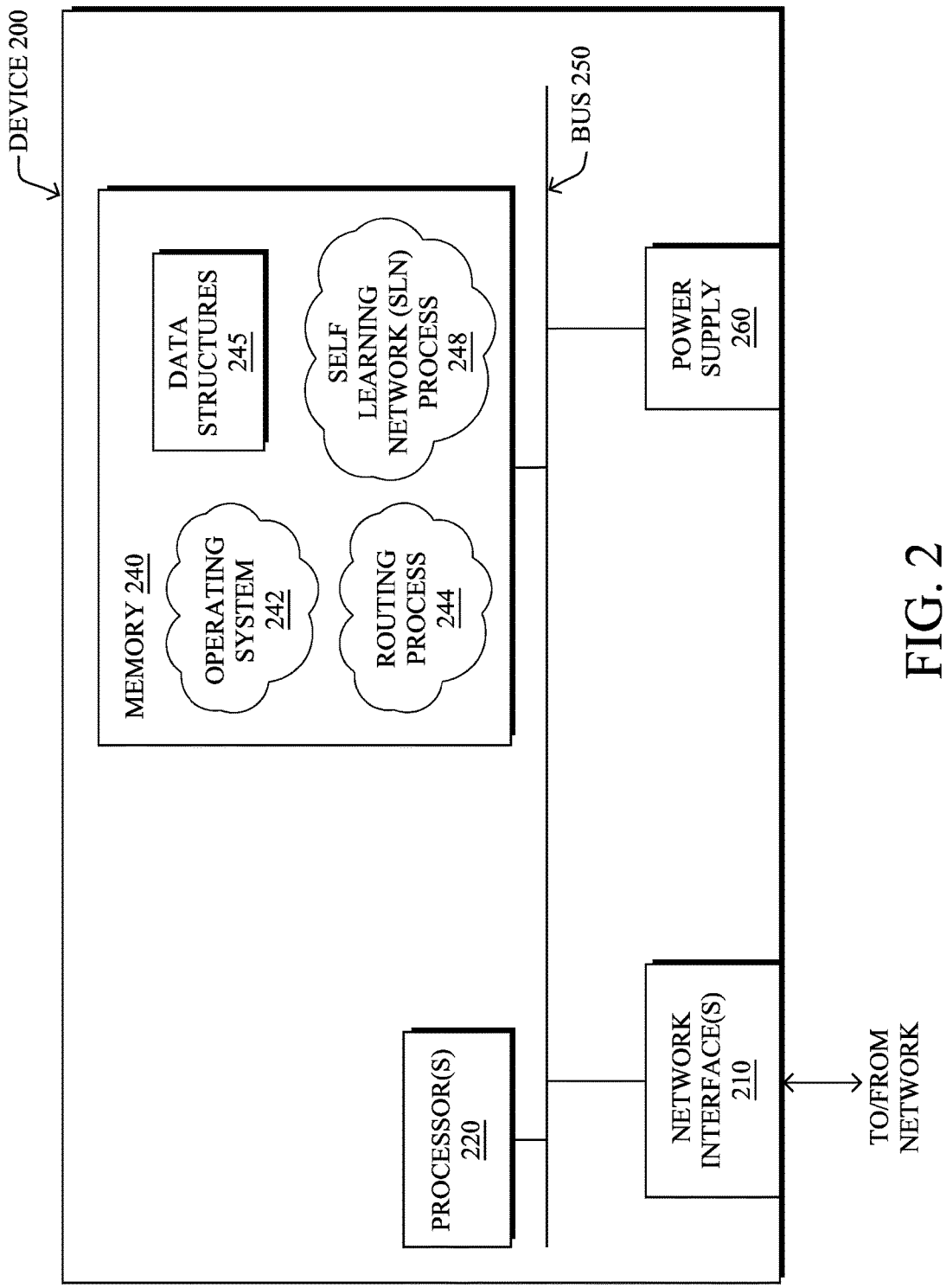
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a self learning network (SLN) process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN"<draft-ietf-12vpn-evpn>, introduce a solution for multipoint L2VPN services, with advanced multi-homing capabilities, using BGP for distributing customer/client media access control (MAC) address reach-ability information over the core MPLS/IP network.

SLN process 248 includes computer executable instructions that, when executed by processor(s) 220, cause device 200 to perform anomaly detection functions as part of an anomaly detection infrastructure within the network. In general, anomaly detection attempts to identify patterns that do not conform to an expected behavior. For example, in one embodiment, the anomaly detection infrastructure of the network may be operable to detect network attacks (e.g., DDoS attacks, the use of malware such as viruses, rootkits, etc.). However, anomaly detection in the context of computer networking typically presents a number of challenges: 1.) a lack of a ground truth (e.g., examples of normal vs. abnormal network behavior), 2.) being able to define a "normal" region in a highly dimensional space can be challenging, 3.) the dynamic nature of the problem due to changing network behaviors/anomalies, 4.) malicious behaviors such as malware, viruses, rootkits, etc. may adapt in order to appear "normal," and 5.) differentiating between noise and relevant anomalies is not necessarily possible from a statistical standpoint, but typically also requires domain knowledge.

Anomalies may also take a number of forms in a computer network: 1.) point anomalies (e.g., a specific data point is abnormal compared to other data points), 2.) contextual anomalies (e.g., a data point is abnormal in a specific context but not when taken individually), or 3.) collective anomalies (e.g., a collection of data points is abnormal with regards to an entire set of data points). Generally, anomaly detection refers to the ability to detect an anomaly that could be triggered by the presence of malware attempting to access data (e.g., data exfiltration), spyware, ransom-ware, etc. and/or non-malicious anomalies such as misconfigurations or misbehaving code. Particularly, an anomaly may be raised in a number of circumstances:

Security threats: the presence of a malware using unknown attacks patterns (e.g., no static signatures) may lead to modifying the behavior of a host in terms of traffic patterns, graphs structure, etc. Machine learning processes may detect these types of anomalies using advanced approaches capable of modeling subtle changes or correlation between changes (e.g., unexpected behavior) in a highly dimensional space. Such anomalies are raised in order to detect, e.g., the presence of a 0-day malware, malware used to perform data ex-filtration thanks to a Command and Control (C2) channel, or even to trigger (Distributed) Denial of Service (DoS) such as DNS reflection, UDP flood, HTTP recursive get, etc. In the case of a (D)DoS, although technical an anomaly, the term "DoS" is usually used.

SLN process 248 may detect malware based on the corresponding impact on traffic, host models, graph-based analysis, etc., when the malware attempts to connect to a C2 channel, attempts to move laterally, or exfiltrate information using various techniques.

Misbehaving devices: a device such as a laptop, a server of a network device (e.g., storage, router, switch, printer, etc.) may misbehave in a network for a number of reasons: 1.) a user using a discovery tool that performs (massive) undesirable scanning in the network (in contrast with a lawful scanning by a network management tool performing device discovery), 2.) a software defect (e.g. a switch or router dropping packet because of a corrupted RIB/FIB or the presence of a persistent loop by a routing protocol hitting a corner case).

Dramatic behavior change: the introduction of a new networking or end-device configuration, or even the introduction of a new application may lead to dramatic behavioral changes. Although technically not anomalous, an SLN-enabled node having computed behavioral model(s) may raise an anomaly when detecting a brutal behavior change. Note that in such as case, although an anomaly may be raised, a learning system such as SLN is expected to learn the new behavior and dynamically adapts according to potential user feedback.

Misconfigured devices: a configuration change may trigger an anomaly: a misconfigured access control list (ACL), route redistribution policy, routing policy, QoS policy maps, or the like, may have dramatic consequences such a traffic black-hole, QoS degradation, etc.

SLN process 248 may advantageously identify these forms of misconfigurations, in order to be detected and fixed.

In various embodiments, SLN process 248 may utilize machine learning techniques, to perform anomaly detection in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DB-SCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space.

Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

According to various embodiments, SLN process 248 may also use graph-based models for purposes of anomaly detection. Generally speaking, a graph-based model attempts to represent the relationships between different entities as a graph of nodes interconnected by edges. For example, ego-centric graphs have been used to represent the relationship between a particular social networking profile and the other profiles connected to it (e.g., the connected "friends" of a user, etc.). The patterns of these connections can then be analyzed for purposes of anomaly detection. For example, in the social networking context, it may be considered anomalous for the connections of a particular profile not to share connections, as well. In other words, a person's social connections are typically also interconnected. If no such interconnections exist, this may be deemed anomalous.

Figure 3:
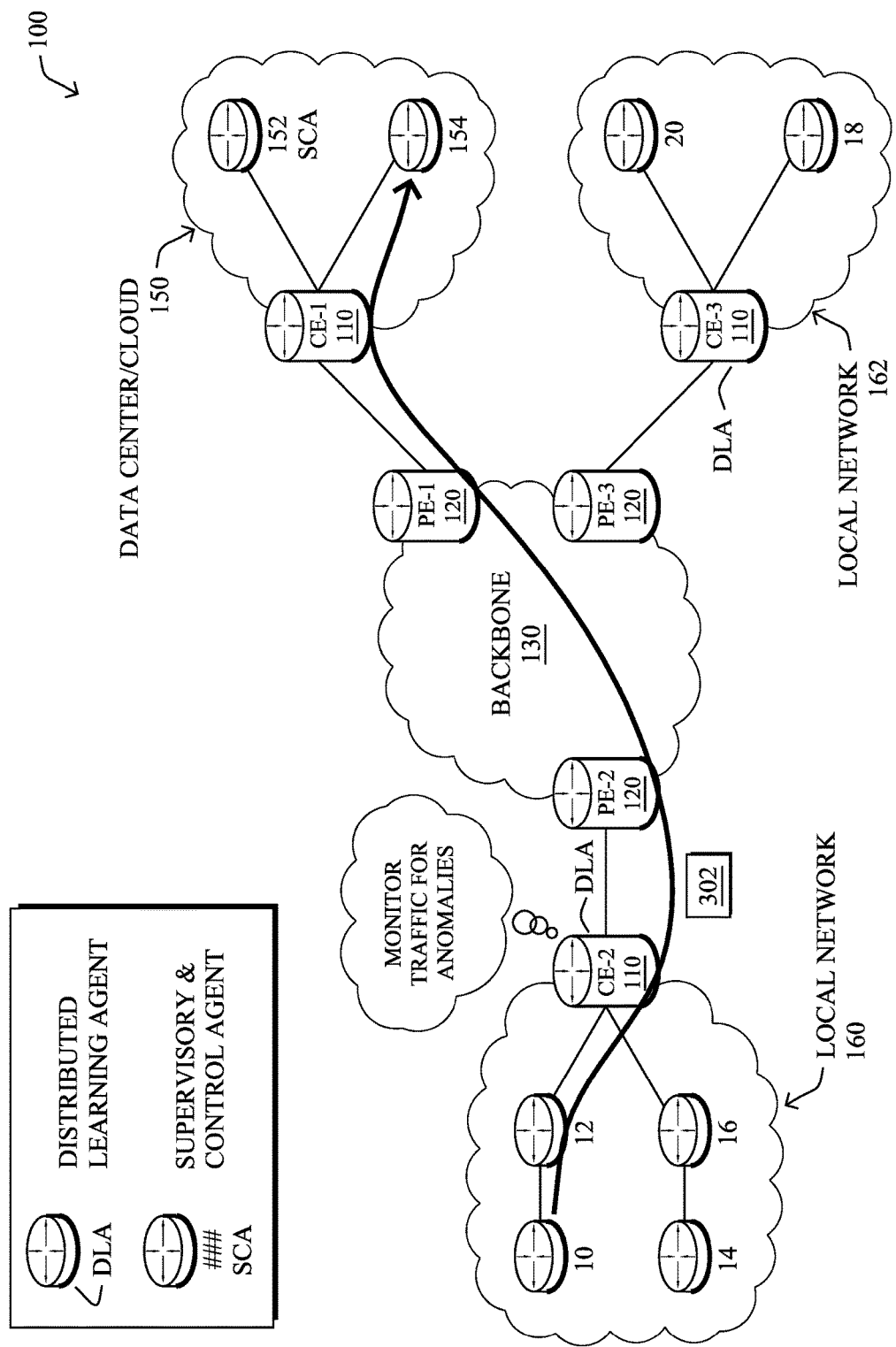
FIG. 3 illustrates an example self learning network (SLN) infrastructure.

An example self learning network (SLN) infrastructure that may be used to detect network anomalies is shown in FIG. 3, according to various embodiments. Generally, network devices may be configured to operate as part of an SLN infrastructure to detect, analyze, and/or mitigate network anomalies such as network attacks (e.g., by executing SLN process 248). Such an infrastructure may include certain network devices acting as distributed learning agents (DLAs) and one or more supervisory/centralized devices acting as a supervisory and control agent (SCA). A DLA may be operable to monitor network conditions (e.g., router states, traffic flows, etc.), perform anomaly detection on the monitored data using one or more machine learning models, report detected anomalies to the SCA, and/or perform local mitigation actions. Similarly, an SCA may be operable to coordinate the deployment and configuration of the DLAs (e.g., by downloading software upgrades to a DLA, etc.), receive information from the DLAs (e.g., detected anomalies/attacks, compressed data for visualization, etc.), provide information regarding a detected anomaly to a user interface (e.g., by providing a webpage to a display, etc.), and/or analyze data regarding a detected anomaly using more CPU intensive machine learning processes.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests (e.g., SYN flooding, sending an overwhelming number of requests to an HTTP server, etc.), to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

DoS attacks are relatively easy to detect when they are brute-force (e.g. volumetric), but, especially when highly distributed, they may be difficult to distinguish from a flash-crowd (e.g., an overload of the system due to many legitimate users accessing it at the same time). This fact, in conjunction with the increasing complexity of performed attacks, makes the use of "classic" (usually threshold-based) techniques useless for detecting them. However, machine learning techniques may still be able to detect such attacks, before the network or service becomes unavailable. For example, some machine learning approaches may analyze changes in the overall statistical behavior of the network traffic (e.g., the traffic distribution among flow flattens when a DDoS attack based on a number of microflows happens). Other approaches may attempt to statistically characterizing the normal behaviors of network flows or TCP connections, in order to detect significant deviations. Classification approaches try to extract features of network flows and traffic that are characteristic of normal traffic or malicious traffic, constructing from these features a classifier that is able to differentiate between the two classes (normal and malicious).

As shown in FIG. 3, routers CE-2 and CE-3 may be configured as DLAs and server 152 may be configured as an SCA, in one implementation. In such a case, routers CE-2 and CE-3 may monitor traffic flows, router states (e.g., queues, routing tables, etc.), or any other conditions that may be indicative of an anomaly in network 100. As would be appreciated, any number of different types of network devices may be configured as a DLA (e.g., routers, switches, servers, blades, etc.) or as an SCA.

Assume, for purposes of illustration, that CE-2 acts as a DLA that monitors traffic flows associated with the devices of local network 160 (e.g., by comparing the monitored conditions to one or more machine-learning models). For example, assume that device/node 10 sends a particular traffic flow 302 to server 154 (e.g., an application server, etc.). In such a case, router CE-2 may monitor the packets of traffic flow 302 and, based on its local anomaly detection mechanism, determine that traffic flow 302 is anomalous. Anomalous traffic flows may be incoming, outgoing, or internal to a local network serviced by a DLA, in various cases.

In some cases, traffic 302 may be associated with a particular application supported by network 100. Such applications may include, but are not limited to, automation applications, control applications, voice applications, video applications, alert/notification applications (e.g., monitoring applications), communication applications, and the like. For example, traffic 302 may be email traffic, HTTP traffic, traffic associated with an enterprise resource planning (ERP) application, etc.

In various embodiments, the anomaly detection mechanisms in network 100 may use Internet Behavioral Analytics (IBA). In general, IBA refers to the use of advanced analytics coupled with networking technologies, to detect anomalies in the network. Although described later with greater details, the ability to model the behavior of a device (networking switch/router, host, etc.) will allow for the detection of malware, which is complementary to the use of a firewall that uses static signatures. Observing behavioral changes (e.g., a deviation from modeled behavior) thanks to aggregated flows records, deep packet inspection, etc., may allow detection of an anomaly such as an horizontal movement (e.g. propagation of a malware, etc.), or an attempt to perform information exfiltration.

Figure 4:
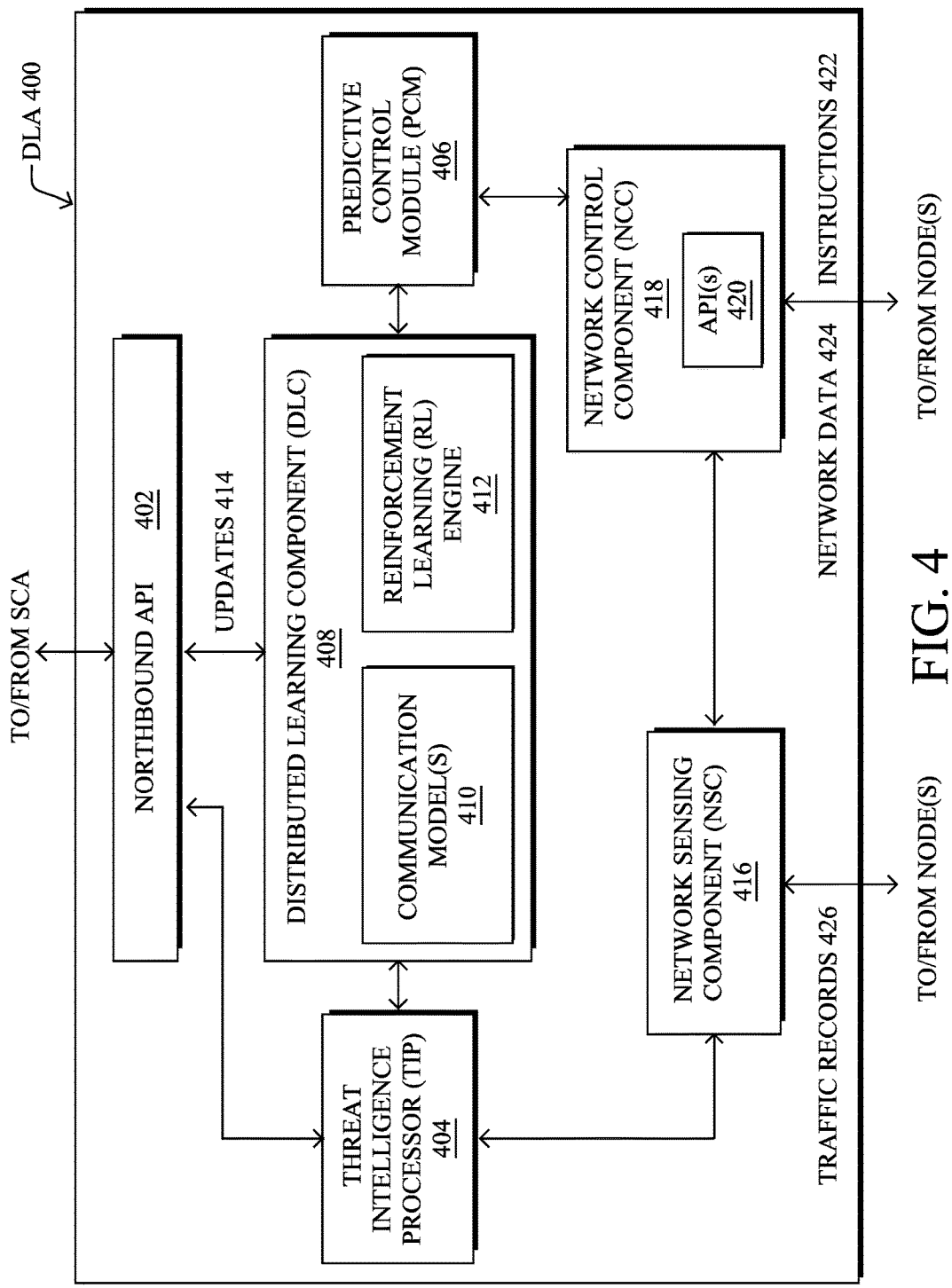
FIG. 4 illustrates an example distributed learning agent (DLA)

FIG. 4 illustrates an example distributed learning agent (DLA) 400 in greater detail, according to various embodiments. Generally, a DLA may comprise a series of modules hosting sophisticated tasks (e.g., as part of an overall SLN process 248). Generally, DLA 400 may communicate with an SCA (e.g., via one or more northbound APIs 402) and any number of nodes/devices in the portion of the network associated with DLA 400 (e.g., via APIs 420, etc.).

In some embodiments, DLA 400 may execute a Network Sensing Component (NSC) 416 that is a passive sensing construct used to collect a variety of traffic record inputs 426 from monitoring mechanisms deployed to the network nodes. For example, traffic record inputs 426 may include Cisco™ Netflow records, application identification information from a Cisco™ Network Based Application Recognition (NBAR) process or another application-recognition mechanism, administrative information from an administrative reporting tool (ART), local network state information service sets, media metrics, or the like.

Furthermore, NSC 416 may be configured to dynamically employ Deep Packet Inspection (DPI), to enrich the mathematical models computed by DLA 400, a critical source of information to detect a number of anomalies. Also of note is that accessing control/data plane data may be of utmost importance, to detect a number of advanced threats such as data exfiltration. NSC 416 may be configured to perform data analysis and data enhancement (e.g., the addition of valuable information to the raw data through correlation of different information sources). Moreover, NSC 416 may compute various networking based metrics relevant for the Distributed Learning Component (DLC) 408, such as a large number of statistics, some of which may not be directly interpretable by a human.

In some embodiments, DLA 400 may also include DLC 408 that may perform a number of key operations such as any or all of the following: computation of Self Organizing Learning Topologies (SOLT), computation of "features" (e.g., feature vectors), advanced machine learning processes, etc., which DLA 400 may use in combination to perform a specific set of tasks. In some cases, DLC 408 may include a reinforcement learning (RL) engine 412 that uses reinforcement learning to detect anomalies or otherwise assess the operating conditions of the network. Accordingly, RL engine 412 may maintain and/or use any number of communication models 410 that model, e.g., various flows of traffic in the network. In further embodiments, DLC 408 may use any other form of machine learning techniques, such as those described previously (e.g., supervised or unsupervised techniques, etc.). For example, in the context of SLN for security, DLC 408 may perform modeling of traffic and applications in the area of the network associated with DLA 400. DLC 408 can then use the resulting models 410 to detect graph-based and other forms of anomalies (e.g., by comparing the models with current network characteristics, such as traffic patterns. The SCA may also send updates 414 to DLC 408 to update model(s) 410 and/or RL engine 412 (e.g., based on information from other deployed DLAs, input from a user, etc.).

When present, RL engine 412 may enable a feed-back loop between the system and the end user, to automatically adapt the system decisions to the expectations of the user and raise anomalies that are of interest to the user (e.g., as received via a user interface of the SCA). In one embodiment, RL engine 412 may receive a signal from the user in the form of a numerical reward that represents for example the level of interest of the user related to a previously raised event. Consequently the agent may adapt its actions (e.g. search for new anomalies), to maximize its reward over time, thus adapting the system to the expectations of the user. More specifically, the user may optionally provide feedback thanks to a lightweight mechanism (e.g., 'like' or 'dislike') via the user interface.

In some cases, DLA 400 may include a threat intelligence processor (TIP) 404 that processes anomaly characteristics so as to further assess the relevancy of the anomaly (e.g. the applications involved in the anomaly, location, scores/degree of anomaly for a given model, nature of the flows, or the like). TIP 404 may also generate or otherwise leverage a machine learning-based model that computes a relevance index. Such a model may be used across the network to select/prioritize anomalies according to the relevancies.

DLA 400 may also execute a Predictive Control Module (PCM) 406 that triggers relevant actions in light of the events detected by DLC 408. In order words, PCM 406 is the decision maker, subject to policy. For example, PCM 406 may employ rules that control when DLA 400 is to send information to the SCA (e.g., alerts, predictions, recommended actions, trending data, etc.) and/or modify a network behavior itself. For example, PCM 406 may determine that a particular traffic flow should be blocked (e.g., based on the assessment of the flow by TIP 404 and DLC 408) and an alert sent to the SCA.

Network Control Component (NCC) 418 is a module configured to trigger any of the actions determined by PCM 406 in the network nodes associated with DLA 400. In various embodiments, NCC 418 may communicate the corresponding instructions 422 to the network nodes using APIs 420 (e.g., DQoS interfaces, ABR interfaces, DCAC interfaces, etc.). For example, NCC 418 may send mitigation instructions 422 to one or more nodes that instruct the receives to reroute certain anomalous traffic, perform traffic shaping, drop or otherwise "black hole" the traffic, or take other mitigation steps. In some embodiments, NCC 418 may also be configured to cause redirection of the traffic to a "honeypot" device for forensic analysis. Such actions may be user-controlled, in some cases, through the use of policy maps and other configurations. Note that NCC 418 may be accessible via a very flexible interface allowing a coordinated set of sophisticated actions. In further embodiments, API(s) 420 of NCC 418 may also gather/receive certain network data 424 from the deployed nodes such as Cisco™ OnePK information or the like.

The various components of DLA 400 may be executed within a container, in some embodiments, that receives the various data records and other information directly from the host router or other networking device. Doing so prevents these records from consuming additional bandwidth in the external network. This is a major advantage of such a distributed system over centralized approaches that require sending large amount of traffic records. Furthermore, the above mechanisms afford DLA 400 additional insight into other information such as control plane packet and local network states that are only available on premise. Note also that the components shown in FIG. 4 may have a low footprint, both in terms of memory and CPU. More specifically, DLA 400 may use lightweight techniques to compute features, identify and classify observation data, and perform other functions locally without significantly impacting the functions of the host router or other networking device.

As noted above, edge devices may perform anomaly detection by analyzing traffic flows. In the context of building anomaly detection models at the network edge from network traffic, there is a central tradeoff between using very specific models and very general models. Notably, models constructed from all of the traffic for a given application are very general in nature and can get a lot of samples if there is enough traffic for the application. As a consequence, these models tend to be rather confident and accurate in modeling many different behaviors at the same time. Such models are essential to detecting very strong network anomalies with high confidence. However, because they mix up a large number of behaviors, they tend to miss more subtle anomalies where the traffic is anomalous for the specific hosts involved.

On the other hand, very specific models such as those based on the traffic between two hosts, or two groups of hosts, can be useful for detecting more subtle anomalies that appear only in a specific context. However, very specific models can also suffer from low-samples effects, as there may be much less input data to assess. For example, a very general model may assess all of the HTTP traffic for the local network, whereas a very specific model may assess HTTP traffic for only a particular host in the local network. Thus, the very specific model may be better able to identify subtle anomalies for the specific host, but also have significantly smaller set of traffic data to assess. As a consequence, finding the right scale at which to build statistical models is difficult.

Hierarchical Models to Organize Learning Topologies

The techniques herein introduce a multi-scale method for network traffic anomaly detection on distributed learning agents, where models corresponding to different levels of aggregation and specificity are built in parallel. In some aspects, all the output scores of these models are then use to score input events in terms of how anomalous they are. In addition, the capacity and dimensionality of machine learning models is adapted dynamically based on the performance and confidence of the models.

Specifically, according to one or more embodiments of the disclosure as described in detail below, a device in a network maintains a plurality of anomaly detection models for different sets of aggregated traffic data regarding traffic in the network. The device determines a measure of confidence in a particular one of the anomaly detection models that evaluates a particular set of aggregated traffic data. The device dynamically replaces the particular anomaly detection model with a second anomaly detection model configured to evaluate the particular set of aggregated traffic data and has a different model capacity than that of the particular anomaly detection model. The device provides an anomaly event notification to a supervisory controller based on a combined output of the second anomaly detection model and of one or more of the anomaly detection models in the plurality of anomaly detection models.

Illustratively, the techniques described herein may be performed by hardware, software, and/or firmware, such as in accordance with the SLN process 248, which may include computer executable instructions executed by the processor 220 (or independent processor of interfaces 210) to perform functions relating to the techniques described herein, e.g., in conjunction with routing process 244.

Operationally, a first aspect of the multi-scale mechanism associates input traffic with model keys, based on a policy. This component can either process raw network data (e.g., Netflow records, DPI records, other types of network records, etc.) and/or aggregated data (e.g., features computed in time bins based on raw network data). In general, a model key is an identifier of the model. A given chunk of input data, or bin of aggregated data, can be associated with multiple model keys. For instance, a Netflow or other traffic record, or aggregated traffic bin, could be associated to any or all of the following model keys:

Application classification of traffic
Source IP and application classification of traffic
Source MAC address and application classification of traffic
Destination IP and application classification of traffic
Destination MAC address and application classification of traffic
Source IP, destination IP, and application classification of traffic
Source MAC, destination MAC, and application classification of traffic Each model key represents a different level of aggregation and mode construction "scale". In particular, the model keys can be selected in a non-uniform fashion. For instance, certain levels of aggregation may be less relevant for some application classification or hosts involved.

In another embodiment, model keys can also be constructed based on groups (or, clusters) or hosts provided by an external system (e.g. a central controller such as an SCA). In this context, IPs and MAC addresses can be mapped to groups, and additional model keys may be used, including:

Source group and application classification of traffic
Destination group and application classification of traffic
Source and destinations groups, and application classification of traffic As indicated above, these multiple scales allow for capturing different levels of anomalies with different levels of confidence.

Figure 5A:
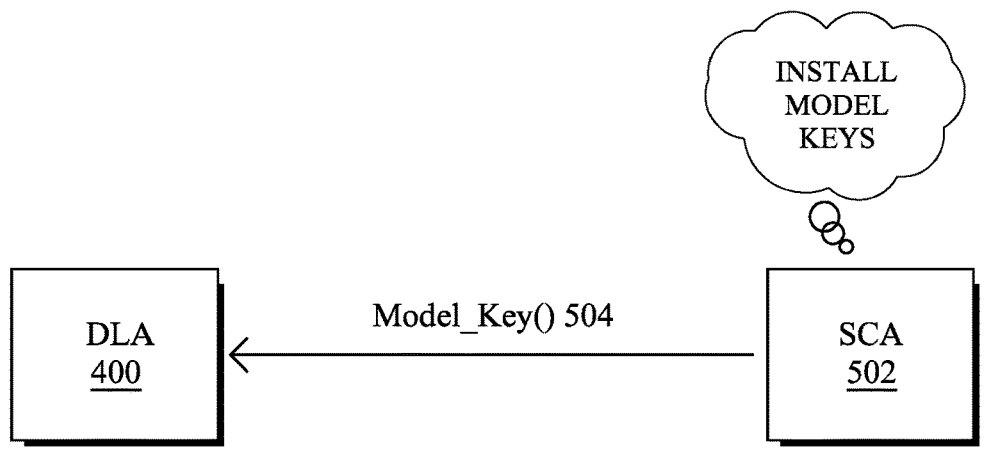
FIGS. 5A-5E illustrate an example of a DLA dynamically swapping anomaly detection models.

FIGS. 5A-5E illustrate an example of a DLA dynamically swapping anomaly detection models, in accordance with various embodiments. In one embodiment model keys may be pre-configured upon set up whereas in another embodiment model keys may be built up on the fly upon requests by a central controller using a custom model-key( ) message sent by the central controller to a DLA. For example, as shown in FIG. 5A, SCA 502 may compute various model keys and install the model keys to DLA 400 via a model_key( ) message 504. Such an approach allows for building granular models that are specific to the criterion such as the DLA location, applications seen by the DLA, etc.

Figure 5B:

A second aspect of the multi-scale mechanism involves the construction of statistical models for each model key, based on all the traffic records or aggregated traffic bins corresponding to these keys. For example, as shown in FIG. 5B, DLA 400 may use traffic data from the local network to construct anomaly detection models based on the model keys received from SCA 402. Any type of statistical model can be used, including approaches based on coding and reconstruction errors, density estimators, or change point detection models. In particular, the models may forget about the past at a rate that does or does not depend on the amount of traffic.

Figure 5C:
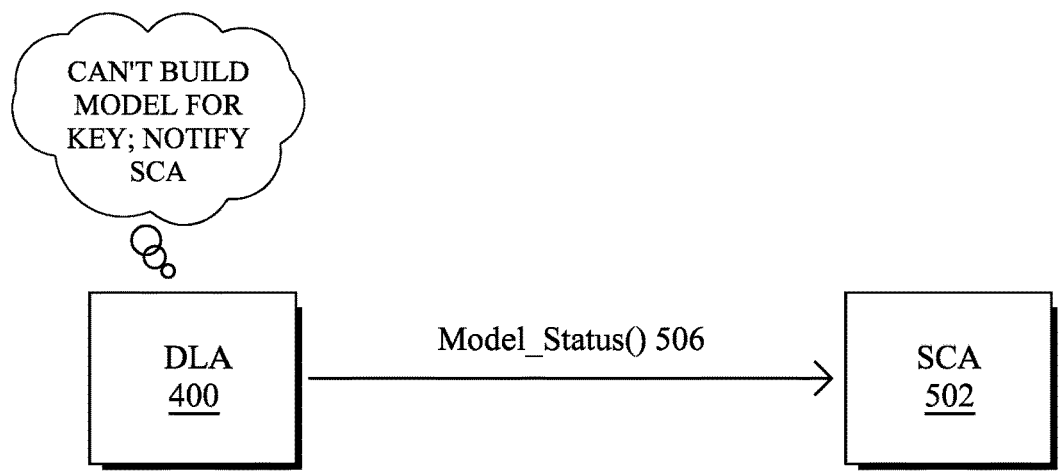

In one embodiment, the DLA may dynamically tune the modeling capacity or dimensionality of each statistical model, depending on the aggregation to which the model corresponds. In machine learning, capacity refers to the ability of a model to capture complex behaviors. Although a high capacity model allows to capture more, it is also much more prone to over fitting, as it can capture and model patterns that are just random or due to noise. For instance, it may be desirable to use a higher capacity model for keys that aggregate a lot of traffic, in order to capture more behaviors. In particular, model capacities and dimensionalities can be dynamically adjusted based on the number of samples per model, the past accuracies of models or other similar metrics. A DLA may also decide not to build models for a given key if they are detected as unstable, lacking samples, etc., in which case a custom message model_status( ) may be used by the DLA to report model status to the central controller. For example, as shown in FIG. 5C, DLA 400 may determine that it does not have sufficient traffic data for a given model key to construct a model. In turn, DLA 400 may notify SCA 502 that the model cannot be constructed via a model_status( ) message 506.

Figure 5D:
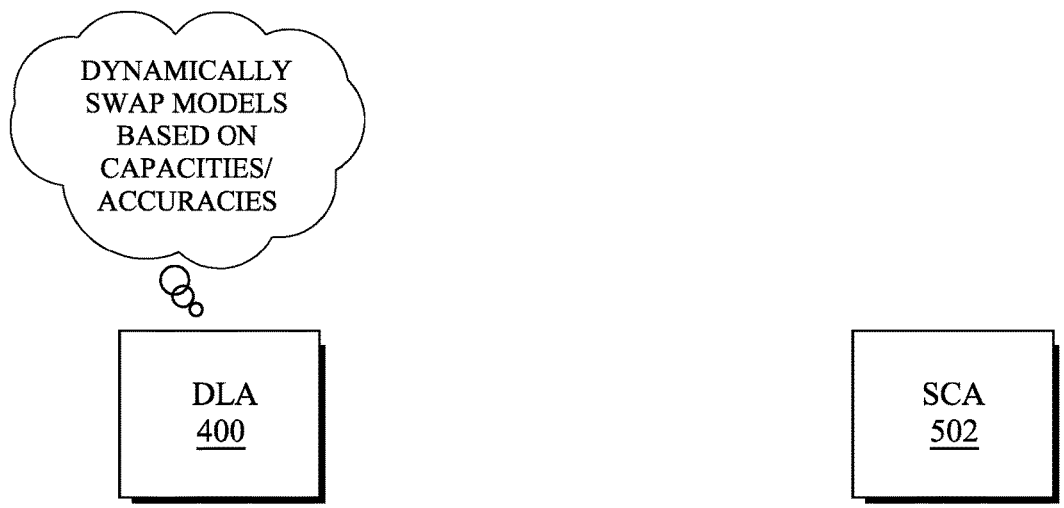

As shown in FIG. 5D, DLA 400 may dynamically swap models based on their capacities and/or accuracies/confidence scores. For example, when the DLA determines that a given model is considered uncertain or inaccurate based on the above metrics, the DLA may start up a lower capacity model corresponding to the same model keys. When the lower capacity model has been trained, the previous model is deactivated, in one embodiment. Similarly, when a model has a very high confidence score, the DLA may start up a higher capacity model in parallel as a substitute, and the previous model is similarly retired when the new model is confident enough.

In one embodiment, the size of the region of the models' input spaces that is considered as anomalous may be estimated using statistical means, and used to temporarily disable the production of scores from models where the anomalous region is tiny or empty. Indeed, some models might degenerate to considering that most behaviors are normal, as might be the case, and the evaluation of this model is thus a waste of computational power.

Figure 5E:
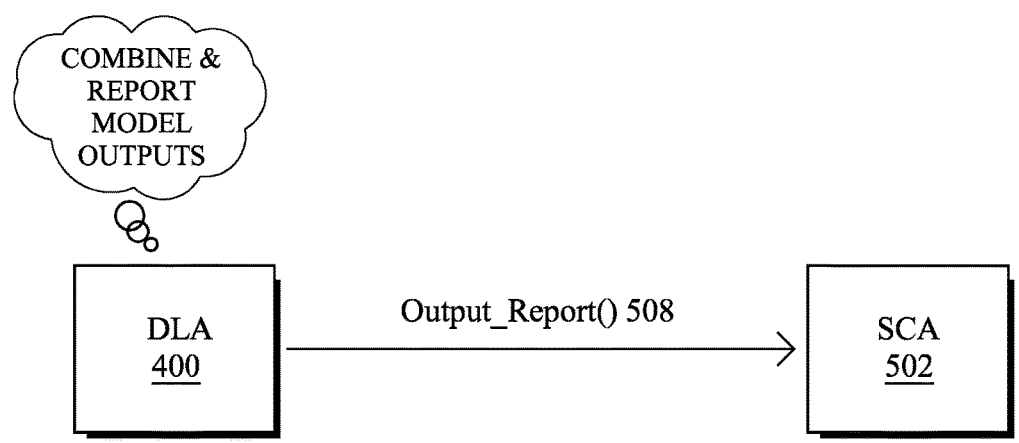

A third aspect of the multi-scale mechanism may monitor the output scores from the models, and transform them into anomaly events that can be forwarded to a global anomaly detection system. In particular, a DLA may combine the outputs of its active models, and use the combined outputs to report anomaly events. For example, as shown in FIG. 5E, DLA 400 may send a custom output_report( ) message 508 to SCA 502 that is based on the combination of model outputs from the active models on DLA 400.

DLA 400 may, based on an internal cost function, decide not to use scores from a model that is considered uncertain according to some statistical metric (such as temporal changes in the model, or overall number of samples used to estimate the model). In addition, DLA 400 may take into account the amount of samples in the models to provide a score for the corresponding anomalies. For instance, input that is anomalous for aggregation levels such as "all the traffic corresponding to a given aggregation" will be anomalous for all the model keys that are more specific and can thus be considered to be a strong anomaly. On the other hand, input that is anomalous only for a specific pair of hosts or groups of hosts may be considered anomalous with less confidence, as this stems from models that are very specific, and may just be a false positive.

DLA 400 may optionally take into account a variety of external feed-back such as signals from SCA 502 about qualities of anomalies for a given key. DLA 400 can store such feedback locally so as to keep track of the relevancy of anomalies on a per-model/per-key basis, in order to trigger appropriate action (e.g. cancel a model that is not efficient enough in order to save CPU and memory resources). In yet another embodiment, the DLA may leverage an internal API to take memory and CPU resources into account, to dynamically control the number of active models according to their performance and the available local resources.

Distributed Architecture for Extreme Tracking of Anomaly Scores

As noted above, an anomaly detection system may use multiple statistical or decision models by combining their scores to reach a final decision. In some cases, the most interesting anomalous events may only be anomalous for a handful of models or experts. This is in particular the case for detection of anomalies from network traffic based on hierarchical models, as described above, where different models may produce scores on different mutually exclusive subsets of the input traffic. For instance, there may be only a subset of models that express scores on a given type of application a given application. In such cases, there may only be a handful of models to express scores on a given chunk of traffic, and requiring many models to agree is unrealistic. This is unlike the common wisdom in other applications of such systems, where multiple models or experts agreeing are the most important.

Additionally, combining many signals and models in the context of anomaly decision may lead to a lot of anomalies, as considering more models increases the statistical odds that some of the input data may be considered anomalous by at least one of them. The generation of many anomalous events is an issue in most anomaly detection systems and especially in distributed systems where a very large number of distributed learning agents may each contribute anomalies. This is particularly true when the decision of a single expert must be considered sufficient to deem an input anomalous. The challenge that stems from these considerations is that of determining which events are most rare in the context of many models, which may express scores on different subsets of the input data.

In particular, the problem is even more acute in a distributed setting, where the models on each DLA might only have a partial view of what events are actually rare at the level of the full system. In addition, memory is usually very limited in distributed systems, and usually already used for storing statistical models. A system for combining and regulating the scores of the models should thus use a very small amount of memory in this context. Similarly, a distributed sequential anomaly detection system usually has real-time processing requirements, and should thus be efficient from a CPU perspective.

In various embodiments, further techniques are introduced that provide an approach for regulating the production of anomalies from distributed models, both locally on the DLAs, and globally on a central controller (e.g., the SCA). More specifically, a system is introduced for tracking scores from multiple statistical models for anomaly detection on a DLA, and selecting the most anomalous events, both from the perspective of the scores seen locally, and of the scores received from other agents. The system groups the models by "buckets" where the models compete with each other in terms of scores produced locally and globally, and model scores that are low with respect to their assigned buckets are used to produce anomalies. This process may proceed in an incremental fashion, by keeping a small state compared to the number of scores received.

Illustratively, the techniques described herein may be performed by hardware, software, and/or firmware, such as in accordance with the SLN process 248, which may include computer executable instructions executed by the processor 220 (or independent processor of interfaces 210) to perform functions relating to the techniques described herein, e.g., in conjunction with routing process 244.

Operationally, the anomaly detection system may track the output scores of its underlying models, possibly produced on a DLA, and identify the rarest events, both from the point of view of the agent and from a global point of view. In some aspects, a first aspect of the score tracking mechanism may models in "buckets" of data. This component maintains a relationship between the models, and a smaller set of buckets, where each bucket corresponds to a set of models. A model may be assigned to multiple bucket groups.

Figure 6A:
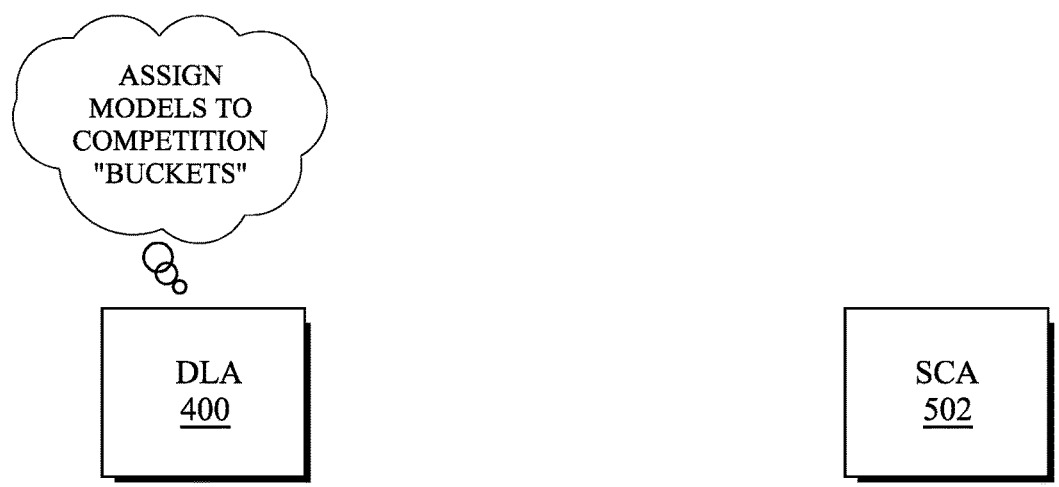
FIGS. 6A-6D illustrate an example of a DLA using model competition bucket groups.

FIGS. 6A-6D illustrate an example of a DLA using model competition bucket groups. The bucketing scheme can be used to create competition between similar models, according to various embodiments. For example, very high-level models may be put in one bucket, while a set of more specific models for a couple very specific devices and a given protocol may be put in another bucket. This can be adjusted to the specifics of the anomaly detection problem considered. As shown in FIG. 6A, DLA 400 may assign its various anomaly detection models to any number of competition bucket groups.

In one embodiment, the bucketing can be modified dynamically based on feedback from a central controller, such as SCA 502. In particular, a DLA may send summary statistics about the buckets, including the models currently assigned to a bucket, or the samples and some summary statistics about the scores contributed by each model to the bucket. This information may be used by the SCA to determine if the buckets encode the desired competition structure between models.

Figure 6B:
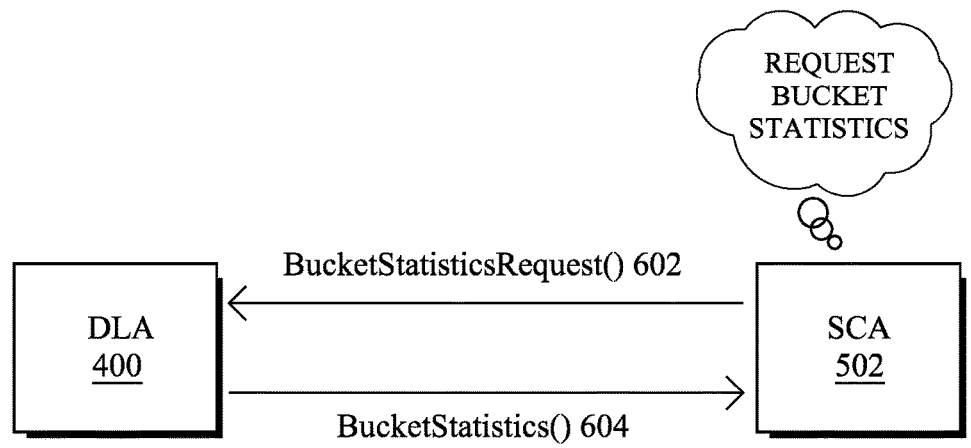
Figure 6C:
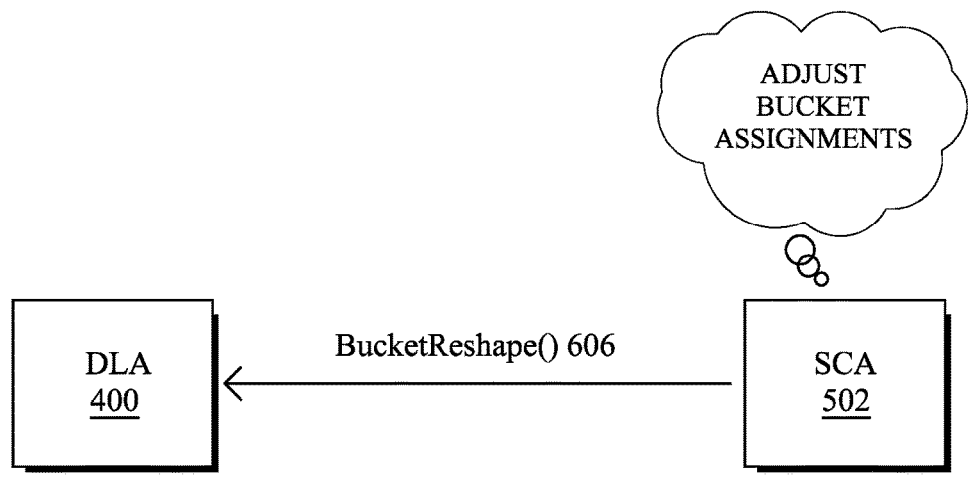
Figure 6D:

In addition, the first component of the score tracking mechanism may receive and handle requests to dynamically reshape the buckets. The following two operations may be supported: (i) merging two buckets, and/or (ii) splitting a bucket in two new empty buckets. In the second case, any data assigned to the two buckets to fuse may either be discarded, or be used to initialize the new buckets. For this, the devices may send custom unicast/multicast messages BucketsStatisticsRequest( ), BucketsStatistics( ), and BucketsReshape( ), to request the summary statistics about the buckets, to send the summary statistics about the buckets, and to perform the fuse/split actions on buckets, respectively. For example, as shown in FIG. 6B, SCA 502 may request bucket statistics/information from DLA 400 regarding its model buckets using a BucketsStatisticsRequest( ) message 602. In response, DLA 400 may return statistics regarding its bucket groups via a BucketStatistics( ) message 604. In addition, as shown in FIG. 6C, SCA 502 may determine that the buckets of DLA 400 should be adjusted and send a BucketReshape( ) message 606 to DLA 400 to do so. As shown in FIG. 6D, DLA 400 may compare intra-bucket models to assess their output scores.

Figure 7C:
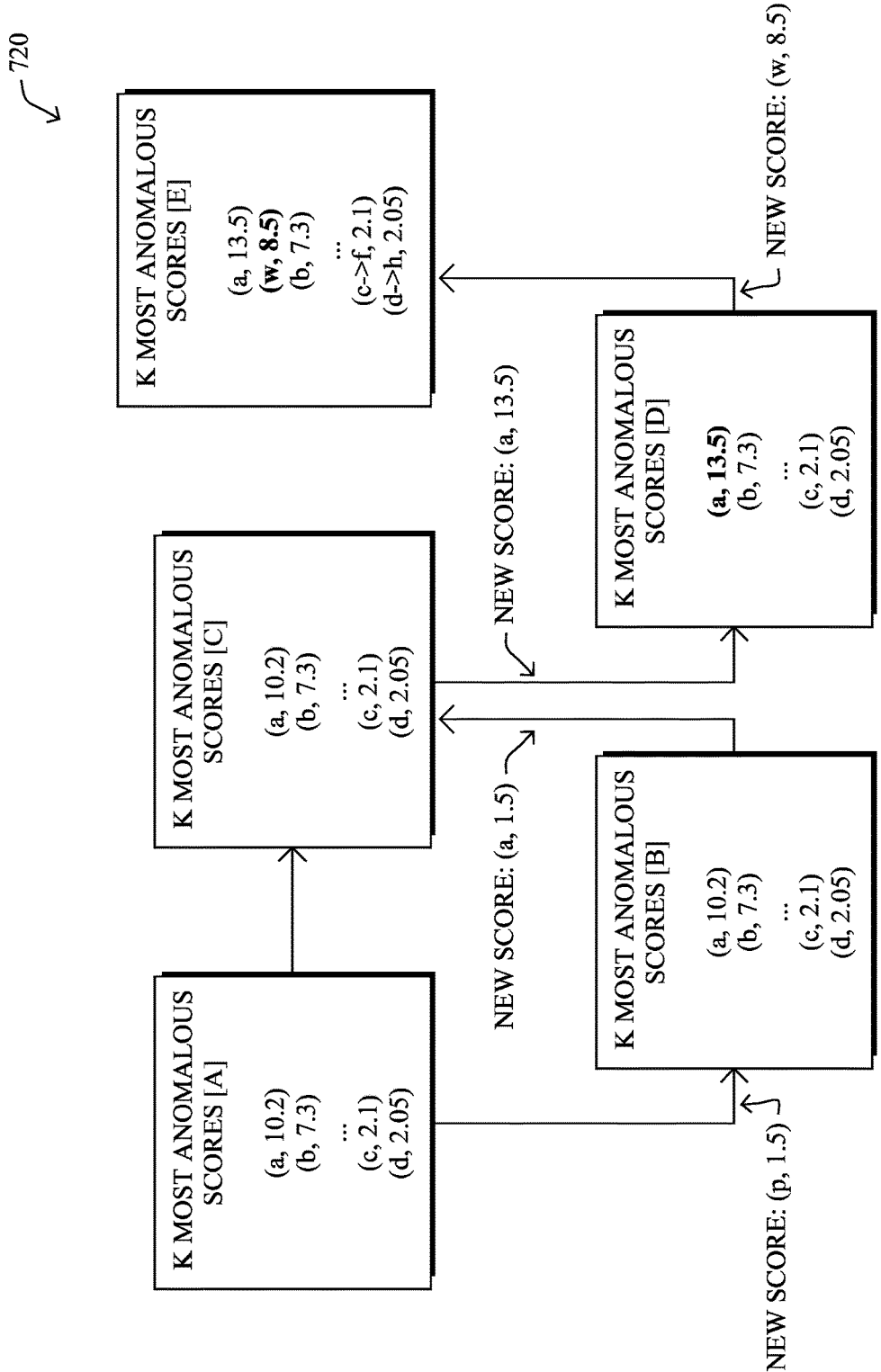

For purposes of illustration only, examples of the score tracking mechanism are illustrated in FIGS. 7A-7C. In a first example shown in illustration 700 of FIG. 7A, consider a single model assigned to a single bucket. In this special case, there is no competition, and the bucket mechanism acts primarily as a detector of extreme score values out of the model. Illustrations 710 shown in FIG. 7B illustrates the case in which two or more models are assigned to the same competition bucket group.

Another aspect of the score tracking mechanism may estimate the most anomalous scores produced over a window by the models in each bucket, in some embodiments. The scores can be integrated into the bucket either immediately, or after a predefined delay. In one embodiment, for each bucket, the device may keep at most K score instances corresponding to the K most anomalous scores seen in the bucket during a time window. Usually, anomalous scores are represented through high score values. This can be achieved through a simple list of the most anomalous scores, or through a more efficient data structure that maintains the scores of the bucket sorted.

The DLA may keep only the scores produced over a given time window by discarding the scores produced earlier than the time of the latest score minus the width of the time window. This requires a careful configuration of K so that the number of scores kept in the tracker doesn't fall excessively.

FIG. 7A illustrates the operation of the bucket mechanism in the single model case with no competition and an infinite window. As shown, the initial contents of the bucket are shown in panel A. After a score update, the bucket remains unchanged in panel B because the score is not anomalous enough to be in the top K. In panel C, a score that is anomalous enough has been observed. The lowest score (e.g., the least anomalous in the set of most anomalous scores) is flushed out of the bucket, and the new score is added to the bucket.

FIG. 7B illustrates the behavior of the bucket approach in the two model case with competition and an infinite window. The initial contents of the bucket are shown in panel A. The bucket is then updated using scores from both models. Only the score from model M1 is anomalous enough to make it to the contents of the bucket. The same applies to the second update. In this case, model M2 is never able to generate scores that are anomalous enough to update the bucket.

In another embodiment, for each bucket, the score tracking mechanism keeps at most K scores instances corresponding to the most anomalous scores seen in the bucket during a time window, with the limitation that only the L most anomalous scores corresponding to a given key can be kept in the bucket. The function charged with selecting the scores of interest may either be locally configured on the DLA or dynamically updated by an SCA with more complex policies (e.g., keep the K top scores over a period of time of H hours, allowing for K'>K if all scores are higher than the 99 percentile computed over the past D days, etc.).

FIG. 7C illustrates the behavior of the above bucket mechanism in the single model case with an infinite window and L=1. For the illustration, lowercase letters are used as keys. The initial contents of the bucket are shown in panel A. After a score update, the bucket remains unchanged in panel B because the score is not anomalous enough to be in the top K. After another score update, the bucket still remains unchanged in panel C, because there is already a more anomalous score for the 'a' key. In panel D, a more anomalous score has been observed for the 'a' key, and replaces the previous one in the bucket. Finally, in panel E, a score corresponding to a new key has been observed, and was sufficiently anomalous to be kept in the bucket.

The key is additional information, orthogonal to the model, which is provided with a score instance. For instance, a network traffic event may lead to multiple scores instances. In this embodiment, a key can be used to ensure that the network traffic event only occupies L slots in the list of scores of the buckets at most. This can be adjusted to the specifics of the anomaly detection problem considered.

A third aspect of the score tracking mechanism may send the contents of the buckets on the DLA along with other information such as the model keys, etc. to the SCA and/or receive such information from other DLAs or the SCA. The devices may send most anomalous score reports for the buckets either periodically or on request. To this end, the devices may send custom unicast/multicast messages Buckets_Most_Anomalous_Scores_Distributions_Request( ) and Buckets_Most_Anomalous_Scores_Distributions( ), to request the buckets' contents from another entity or send its buckets' contents, respectively.

Figure 8A:
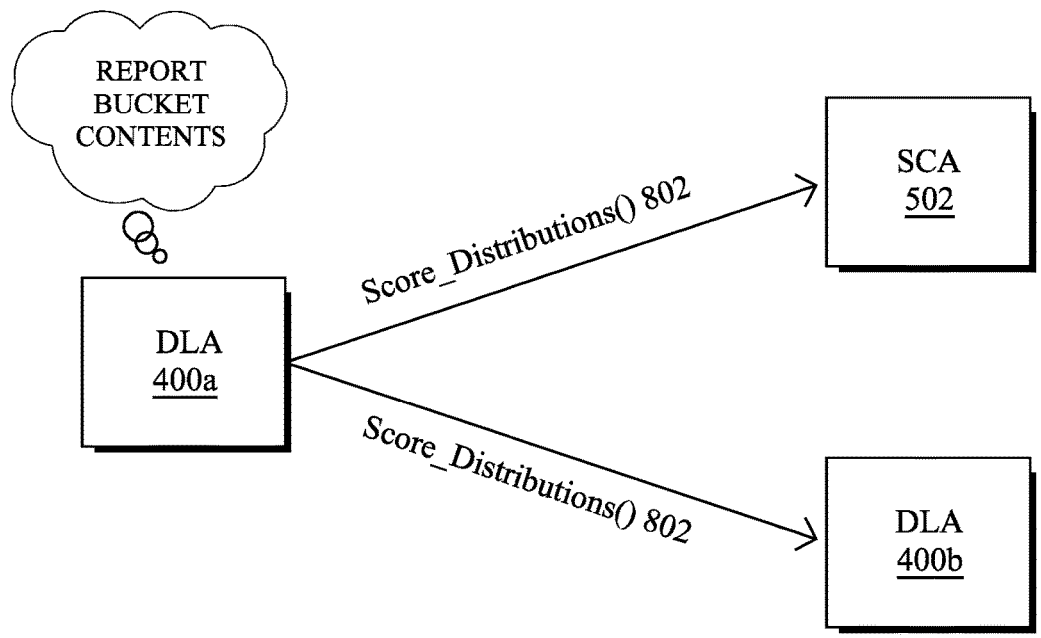
FIGS. 8A-8B illustrate examples of a DLA sharing anomaly score distributions.
Figure 8B:
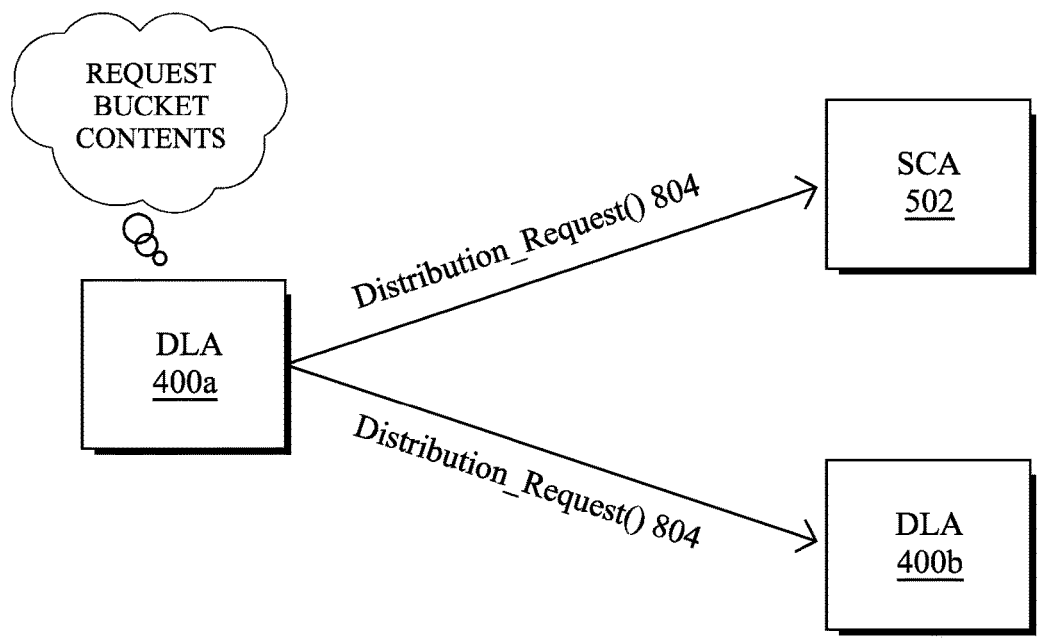

FIGS. 8A-8B illustrate examples of a DLA sharing anomaly score distributions, in various embodiments. As shown in FIG. 8A, DLA 400a may send a Buckets_Most_Anomalous_Scores_Distributions( ) message 802 to SCA 502 and/or any other DLA in the network, such as DLA 400b, to report its most anomalous scores for its buckets. Similarly, as shown in FIG. 8B, DLA 400 may send one or more Buckets_Most_Anomalous_Scores_Distributions_Request( ) messages 804 to SCA 502 or other DLAs, such as DLA 400b, to request their most anomalous scores.

A fourth aspect of the score tracking mechanism may receive scores from the models. For each score instance, the ranks of the score in the buckets where the model is in are computed and aggregated using an aggregation function such as a minimum threshold. If the aggregate rank is below a threshold, an anomalous event is produced. In one embodiment, the ranks are computed only using the local buckets. In another embodiment, the ranks are computed using both the local buckets, and any matching buckets that have been received through the Buckets_Most_Anomalous_Scores_Distributions( ) message.

Dynamic Cooperation of DLAs

Also as noted above, it is paramount that DLAs are able to make immediate decisions as to whether traffic is suspicious, in order to gather enough context about the offending traffic, and report the anomaly without delay. Gathering context may include gathering raw packet data for the offending traffic, or any other traffic that is deemed context-relevant by the system. In particular, this emphasizes that decisions must be taken without much delay directly by the DLA, and that systematically routing the data through the SCA or other DLAs is not acceptable. Note that such issues are even exacerbated in systems such as in the IoT where DLAs are potentially connected to the controller/SCA via low-speed links with potentially intermittent connectivity.

A common issue with DLAs is that they only have a partial view of the network topology and traffic. For anomaly detection based on machine learning, this can result in statistical models that have only been trained on a limited amount of data. As a consequence, these "bird's eye" view models may have lower confidence or prediction accuracy than models that would have been trained using more data, possibly from multiple DLAs. This is especially true in systems that learn and make use of many targeted models, such as in the hierarchical architecture described above. For instance, specific models may be built for DNS servers that are observed in the traffic for groups of desktop machines or for remote cloud servers with which the local users are interacting. In particular, a specific model may also be built for a specific business application, but the corresponding model may only get very limited samples if the application is not used often by the local users.

The techniques herein further introduce an approach for dealing with low-samples regimes and low-confidence models when doing anomaly detection using machine learning at the network edge. DLAs may either auto-assess their statistical models or have a controller (e.g., SCA) assess their statistical models. Such devices may be configured to identify other DLAs that have compatible models, to enrich the local model of a given DLA. Notably, if bandwidth and utility constraints are met, the compatible models may be requested and combined with the local model.

Illustratively, the techniques described herein may be performed by hardware, software, and/or firmware, such as in accordance with the SLN process 248, which may include computer executable instructions executed by the processor 220 (or independent processor of interfaces 210) to perform functions relating to the techniques described herein, e.g., in conjunction with routing process 244.

Figure 9A:
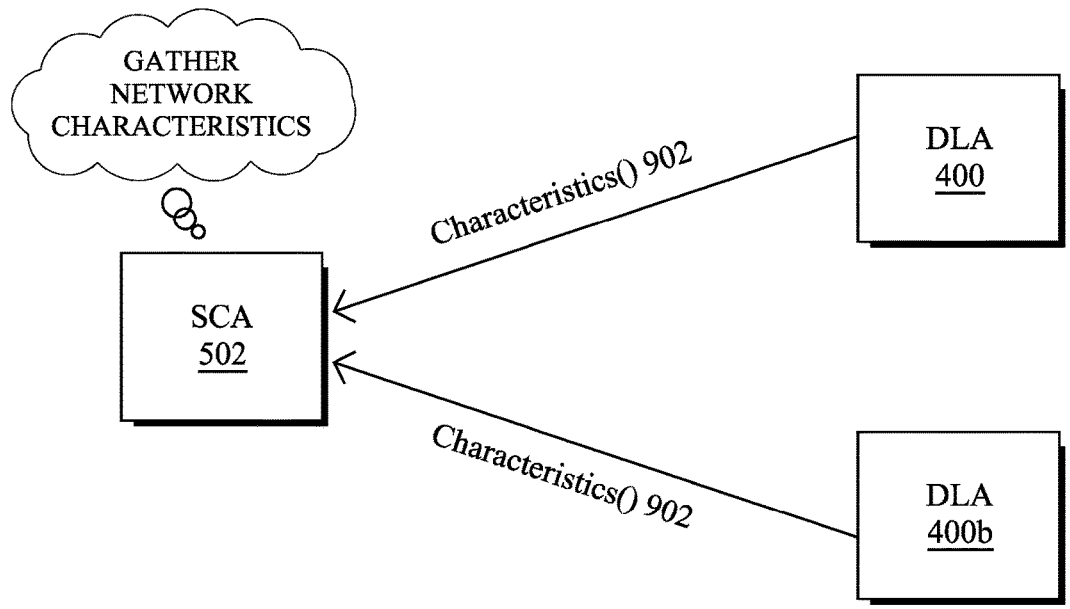
FIGS. 9A-9D illustrate examples of DLAs sharing anomaly detection models.

Operationally, the cooperation mechanism herein allows DLAs to exchange models between one another, in order to improve their real-time prediction accuracy at almost no computational cost. A first component of the cooperation mechanism may monitor the models on the DLAs, and assess whether some of them are insufficiently accurate or confident. For example, as shown in FIG. 9A, SCA 502 or another device (e.g., a particular DLA, etc.) may receive model characteristics 902 from DLAs 400 and 400b.

In a first embodiment, a DLA may examine elements such as the amount of samples, the variance of the predictions, or possibly feedback from an SCA about previous anomalies signaled by the DLA. This is referred to herein as an auto-assessment mode.

In another embodiment, an SCA or other remote controller may perform the above functionality, which may observe the models on the DLAs. The external controller can take advantage of extra data, such as from other DLAs, to determine accuracy and confidence measures for the models in relation to those of other DLAs. This is referred to herein as the relative assessment mode.

In both embodiments, the assessments may be performed periodically for a subset of the models maintained at the DLA. The subset can be selected dynamically based on a cost function depending on the time since the last assessments, confidence metrics, or protocol-specific biases.

A second aspect of the cooperation mechanism may collect summarized network characteristics from other DLAs, and can answer queries as to whether two DLAs are similar from the point of view of their network traffic. In a first embodiment, a DLA itself may perform such functions and may only answer queries as to whether another DLA is similar to the DLA. In a second embodiment, the SCA or other external device may answer any query regarding similarities. The answer to the query is provided under the form of a similarity score, in one embodiment.

The cooperation mechanism allows the DLA or SCA to determine whether models from one DLA are relevant for use at another DLA. The network characteristics may include summary statistics about the hosts seen by the DLA, about the volume of traffic since at different scales by the DLA, or details about applications seen by the DLA (e.g., either application-classification levels metrics, or port and IP protocol-based metrics). In another embodiment, a statistical clustering model can be learned from the data provided by the various DLAs to the SCA. Once properly trained, the model can then be pushed to the DLAs, which may then provide the model ID corresponding to the traffic class used for each model. The SCA may then be able to determine which models may then be shared between DLAs.

Figure 9B:
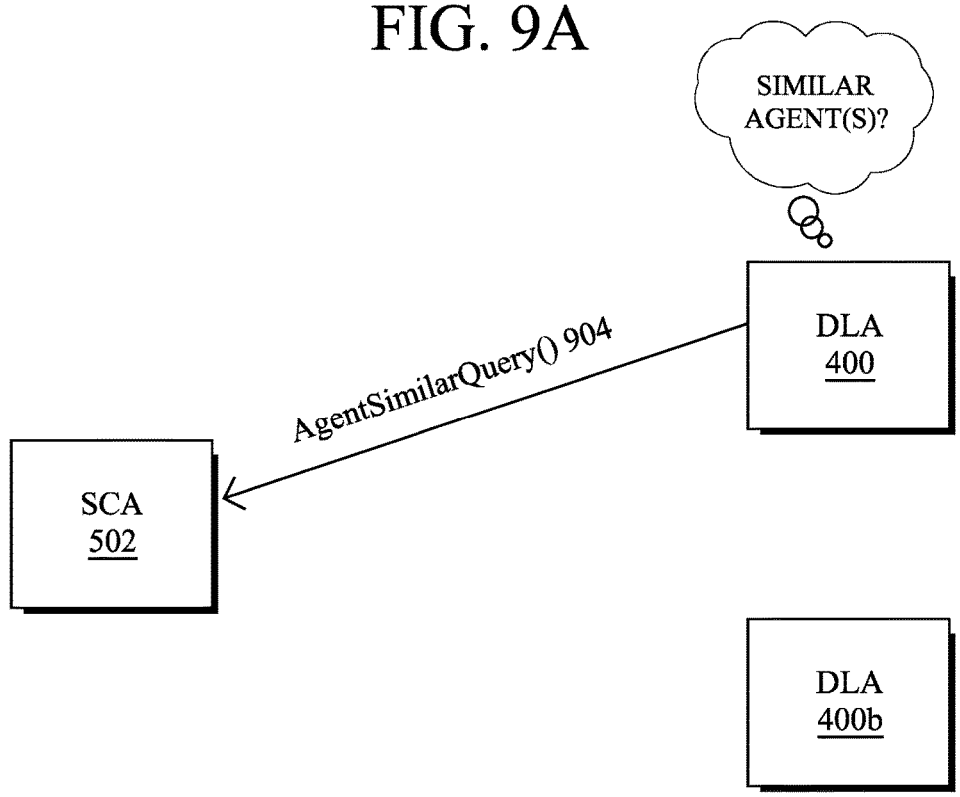
Figure 9C:
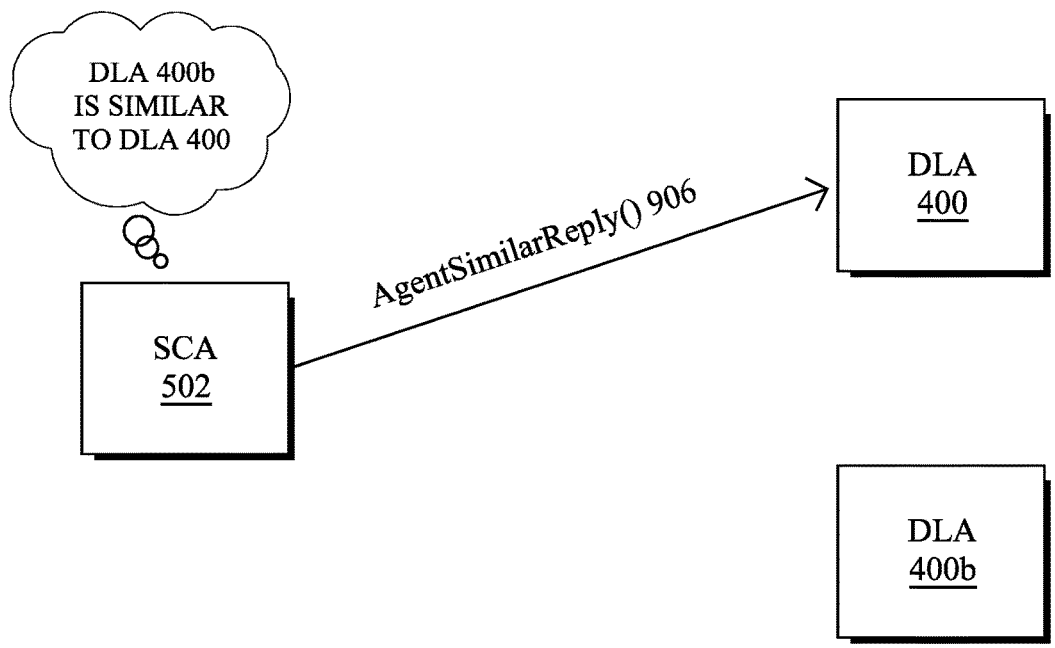

In various embodiments, the devices may exchange unicast or multicast messages, AgentSimilarQuery( ) and AgentSimilarReply( ), to query similarities. For example, as shown in FIG. 9B, DLA 400 may send an AgentSimilarQuery( ) message 904 to SCA 502, to identify any other DLAs with similar models. In response, as shown in FIG. 9C, SCA 502 may indicate that DLA 400b has one or more similar models to those of DLA 400.

A third component of the cooperation mechanism may be a decision system that monitors models deemed uncertain by the above components and decides whether other DLAs have compatible models to complement the incomplete model of the local DLA, and requests these models.

Figure 9D:
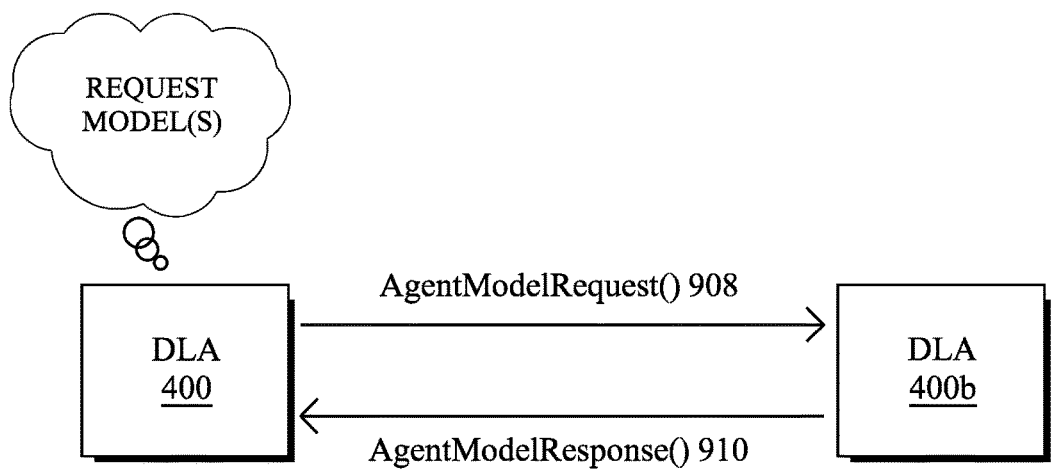

The third component of the cooperation mechanism can decide not to requests models, based on a cost function involving the output of the first component, the similarity with other agents, but also the immediate and historical bandwidth impact. In particular, bandwidth caps can be fixed in order to avoid exchanging too many models at agents that mostly have uncertain models. In addition, the cost function may also be based in part on how often traffic corresponding to the model has been seen in the past. In particular, a very uncertain model for an application for which only a couple packets have been seen may not trigger a request to other agents to learn more. In some embodiments, unicast or multicast messages, AgentModelRequest( ) and AgentModelResponse( ) may be exchanged to query the models. For example, as shown in FIG. 9D, after DLA 400 determines that DLA 400b hosts a similar model, DLA 400 may send an AgentModelRequest( ) message 908 to DLA 400b. In response, DLA 400b may return the requested model to DLA 400 via an AgentModelResponse( ) message 910.

In one embodiment gathering models is performed by a central controller (e.g., an SCA, etc.). In another embodiment, upon determining which DLA host models related to traffic that have similar characteristics, the actual exchange of models may be performed using a distributed approach, with direct communication between DLAs. Such an approach allows for more efficient bandwidth usage in the network and higher scalability.

Figure 10:
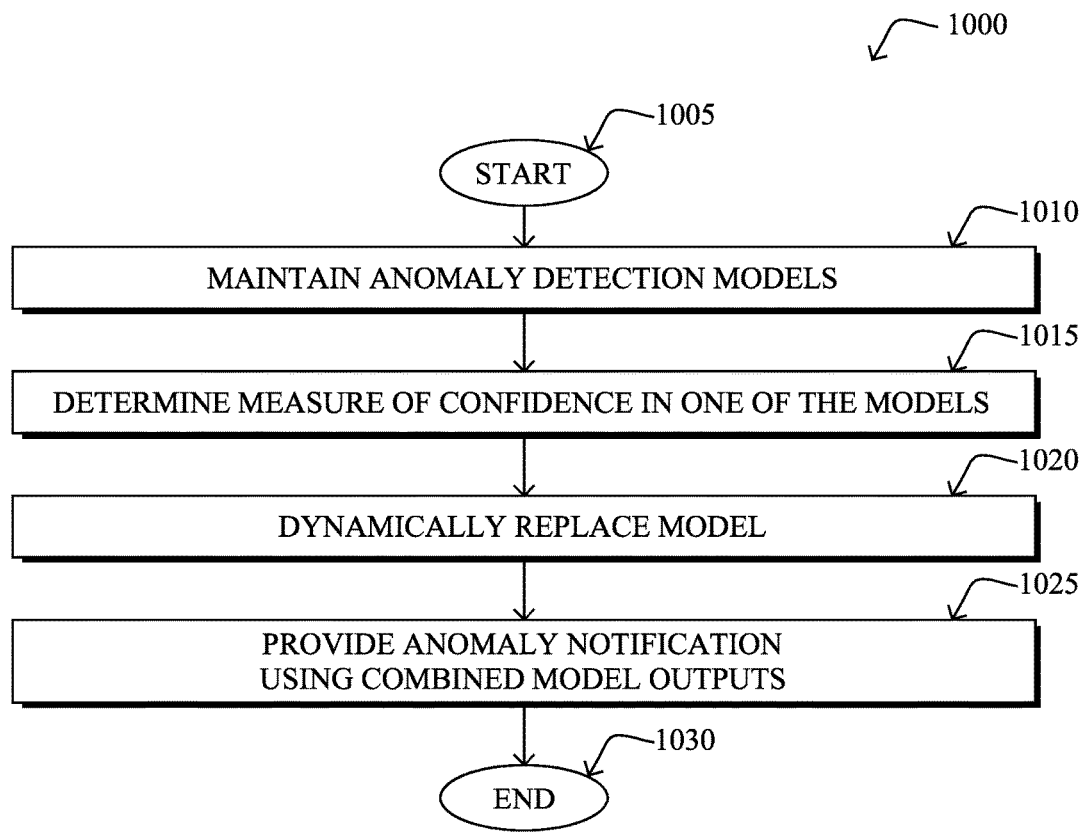
FIG. 10 illustrates an example simplified procedure for using anomaly detection models.

FIG. 10 illustrates an example simplified procedure for using anomaly detection models, in accordance with various embodiments herein. Procedure 1000 may start at step 1005 and continues on to step 1010 where, as described in greater detail above, a device in a network may maintain a plurality of anomaly detection models. In some cases, these models may be statistical models that analyze different sets of aggregated traffic data from the network. For example, one model may be based on both the source IP address of the traffic, as well as traffic associated with a particular application. In contrast, another model may be based on the destination MAC address of the traffic for the particular application.

At step 1015, as detailed above, the device may determine a measure of confidence in one of the plurality of models. As would be appreciated, the device may calculate any number of confidence measures for a particular model. For example, the device may calculate a statistical confidence value for a given statistical model.

At step 1020, the device may dynamically replace the particular model with another model, as described in greater detail above. In various embodiments, the replacement model may have a different capacity than that of the model being replaced. For example, if the first model has a low confidence measure, the device may replace the first model with a lower capacity model. Similarly, if the first model has a high confidence measure, the device may opt to replace this model with another model that has a higher capacity.

At step 1025, as detailed above, the device may provide an anomaly event notification to one or more other devices (e.g., an SCA). Such a notification may be based on a combination of model outputs from, e.g., the replacement model from step 1020 and one or more of the other local models maintained by the device. In some cases, the device may select only those models with the highest n-number of confidence scores for combination. In another embodiment, the device may base the selection on its own available resources, to dynamically adjust the number of models allowed to contribute to the notification. Procedure 1000 then ends at step 1030.

It should be noted that while certain steps within procedure 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide a multi-scale approach allows the system to raise very strong anomalies with large confidence, as they may correspond to higher levels of aggregation, but also more subtle anomalies with a lower confidence. Further aspects of the techniques herein allows for the selection of relevant events to raise anomalies using competition buckets for statistical models. This allows the system to avoid biases due to anomalies with large or low flow volume or durations, as well as to avoid using an excessive amount of memory, which would be especially troublesome on embedded deployments. Finally, cooperation techniques are introduced herein that allow proper predictions to be made in situations where some specific models have only low amounts of samples due to the location of the agent in the network, thus misrepresenting what can be observed over the full network. This potentially leads to false positives, wherein a behavior is scored as highly anomalous by the agent, while other agents would not agree.

While there have been shown and described illustrative embodiments that provide for anomaly detection, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, such as BGP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
maintaining, at a device in a network, a plurality of anomaly detection models for different sets of aggregated traffic data regarding traffic in the network;
determining, by the device, a measure of confidence in a particular one of the anomaly detection models that evaluates a particular set of aggregated traffic data;
dynamically replacing, by the device, the particular anomaly detection model with a second anomaly detection model configured to evaluate the particular set of aggregated traffic data and has a different model capacity than that of the particular anomaly detection model;

providing, by the device, an anomaly event notification to a supervisory controller based on a combined output of the second anomaly detection model and of one or more of the anomaly detection models in the plurality of anomaly detection models;

assigning, by the device, a selected first anomaly detection model from the plurality of anomaly detection models to a competition bucket group;

determining, by the device, an anomaly detection score using the selected first anomaly detection model assigned to the competition bucket group; and including, by the device, the anomaly detection score in a report of most anomalous scores associated with the competition bucket group.

2. The method as in claim 1, further comprising:
receiving, at the device and from the supervisory controller, data indicative of the types of sets of aggregated traffic data that the device should model.

3. The method as in claim 1, further comprising:
dynamically adjusting, by the device, which outputs of the one or more anomaly detection models in the plurality of anomaly detection models should be combined with that of the second anomaly detection model based on available resource of the device.

4. The method as in claim 1, further comprising:
assigning, by the device, a selected second anomaly detection model from the plurality of anomaly detection models to the competition bucket group;

determining, by the device, anomaly detection scores using the selected first and second anomaly detection models assigned to the competition bucket group; and including, by the device, a selected one of the determined anomaly detection scores in the report of most anomalous scores associated with the competition bucket group.

5. The method as in claim 4, wherein the report of most anomalous scores limits the number of anomaly scores that can be associated with any of the different sets of aggregated traffic data.

6. The method as in claim 1, further comprising:
receiving, at the device, an indication of one or more nodes in the network that execute anomaly detection models that are similar to that of the plurality of anomaly detection models maintained at the device; and combining, by the device, an anomaly detection model from one or more of the nodes with one or more of the plurality of anomaly detection models maintained at the device.

7. The method as in claim 6, further comprising:
requesting, by the device, the indication of the one or more nodes in response to a determination that one of the plurality of anomaly detection models has a low confidence value.

8. The method as in claim 1, wherein the aggregated traffic data aggregates one or more of: an application classification of the traffic, a source address or port of the traffic, a destination address or port of the traffic, a source group of host devices associated with the traffic, or a destination group of host devices associated with the traffic.

9. An apparatus, comprising:
one or more network interfaces to communicate with a network;
a processor coupled to the network interfaces and configured to execute one or more processes; and
a memory configured to store a process executable by the processor, the process when executed operable to:
maintain a plurality of anomaly detection models for different sets of aggregated traffic data regarding traffic in the network;
determine a measure of confidence in a particular one of the anomaly detection models that evaluates a particular set of aggregated traffic data;
dynamically replace the particular anomaly detection model with a second anomaly detection model configured to evaluate the particular set of aggregated traffic data and has a different model capacity than that of the particular anomaly detection model;
provide an anomaly event notification to a supervisory controller based on a combined output of the second anomaly detection model and of one or more of the anomaly detection models in the plurality of anomaly detection models;
assign a selected first anomaly detection model from the plurality of anomaly detection models to a competition bucket group;
determine an anomaly detection score using the selected first anomaly detection model assigned to the competition bucket group; and
include the anomaly detection score in a report of most anomalous scores associated with the competition bucket group.

10. The apparatus as in claim 9, wherein the process when executed is further operable to:
receive, from the supervisory controller, data indicative of the types of sets of aggregated traffic data that the apparatus should model.

11. The apparatus as in claim 9, wherein the process when executed is further operable to:
dynamically adjust which outputs of the one or more anomaly detection models in the plurality of anomaly detection models should be combined with that of the second anomaly detection model based on available resource of the apparatus.

12. The apparatus as in claim 9, wherein the process when executed is further operable to:
assign a selected second anomaly detection model from the plurality of anomaly detection models to the competition bucket group;
determine anomaly detection scores using the selected first and second anomaly detection models assigned to the competition bucket group; and
include a selected one of the determined anomaly detection scores in the report of most anomalous scores associated with the competition bucket group.

13. The method as in claim 12, wherein the report of most anomalous scores limits the number of anomaly scores that can be associated with any of the different sets of aggregated traffic data.

14. The apparatus as in claim 9, wherein the process when executed is further operable to:
receive an indication of one or more nodes in the network that execute anomaly detection models that are similar to that of the plurality of anomaly detection models maintained at the apparatus; and
combine an anomaly detection model from one or more of the nodes with one or more of the plurality of anomaly detection models maintained at the apparatus.

15. The apparatus as in claim 14, wherein the process when executed is further operable to:
request the indication of the one or more nodes in response to a determination that one of the plurality of anomaly detection models has a low confidence value.

16. The apparatus as in claim 9, wherein the aggregated traffic data aggregates one or more of: an application classification of the traffic, a source address or port of the traffic, a destination address or port of the traffic, a source group of host devices associated with the traffic, or a destination group of host devices associated with the traffic.

17. A tangible, non-transitory, computer-readable medium storing program instructions that cause a device in a network to execute a process comprising:
maintaining a plurality of anomaly detection models for different sets of aggregated traffic data regarding traffic in the network;
determining a measure of confidence in a particular one of the anomaly detection models that evaluates a particular set of aggregated traffic data;
dynamically replacing the particular anomaly detection model with a second anomaly detection model configured to evaluate the particular set of aggregated traffic data and has a different model capacity than that of the particular anomaly detection model; and
providing an anomaly event notification to a supervisory controller based on a combined output of the second anomaly detection model and of one or more of the anomaly detection models in the plurality of anomaly detection models;
assigning a selected first anomaly detection model from the plurality of anomaly detection models to a competition bucket group;
determining an anomaly detection score using the selected first anomaly detection model assigned to the competition bucket group; and
including the anomaly detection score in a report of most anomalous scores associated with the competition bucket group.

18. The tangible, non-transitory, computer-readable medium as in claim 17, wherein the device is an edge router.

19. The tangible, non-transitory, computer-readable medium as in claim 17, the process further comprising:
assigning, by the device, a selected second anomaly detection model from the plurality of anomaly detection models to the competition bucket group;
determining, by the device, anomaly detection scores using the selected first and second anomaly detection models assigned to the competition bucket group; and
including, by the device, a selected one of the determined anomaly detection scores in the report of most anomalous scores associated with the competition bucket group.

20. The tangible, non-transitory, computer-readable medium as in claim 19, wherein the report of most anomalous scores limits the number of anomaly scores that can be associated with any of the different sets of aggregated traffic data.

* * * * *